Patented Jan. 17, 1928.

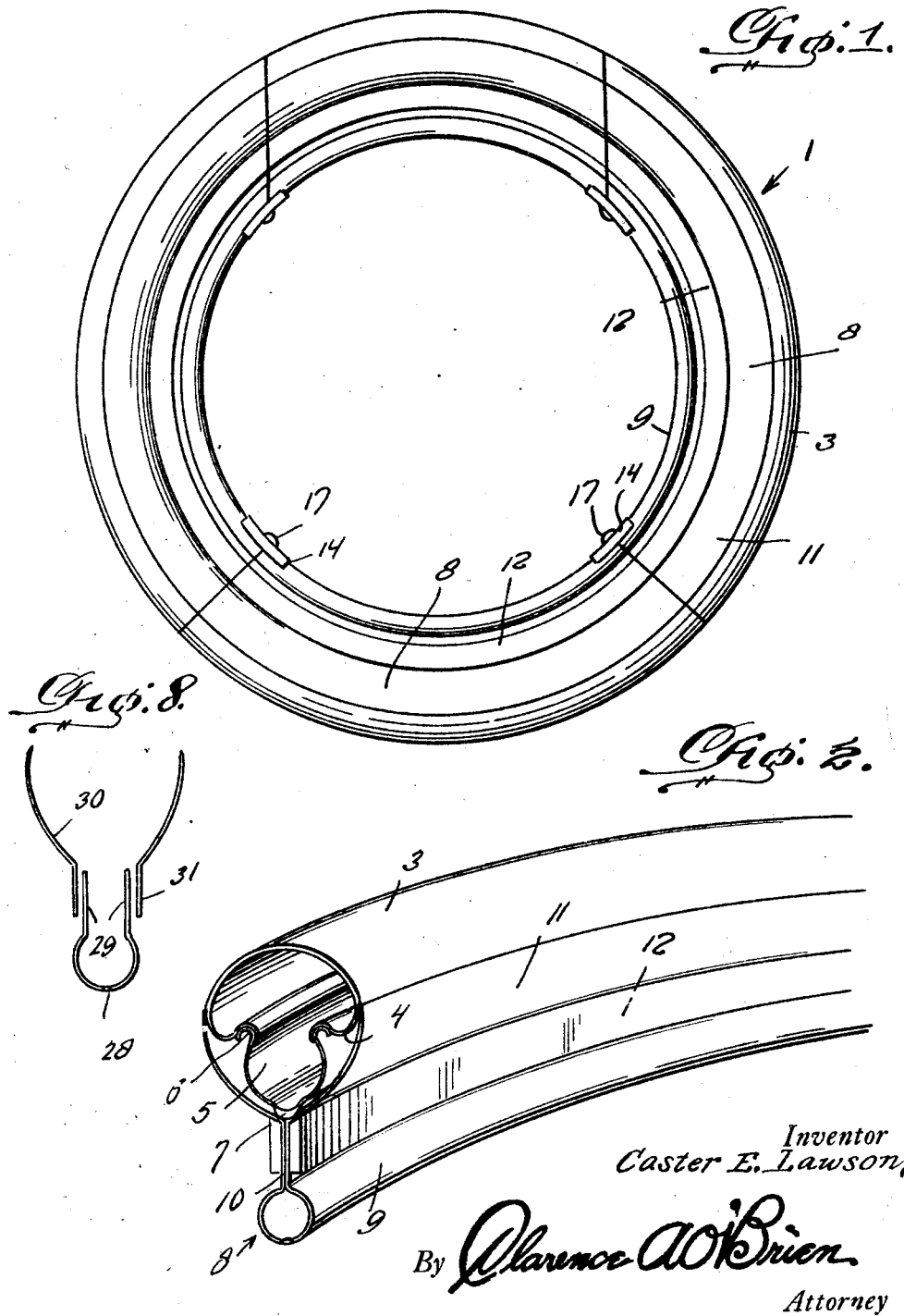

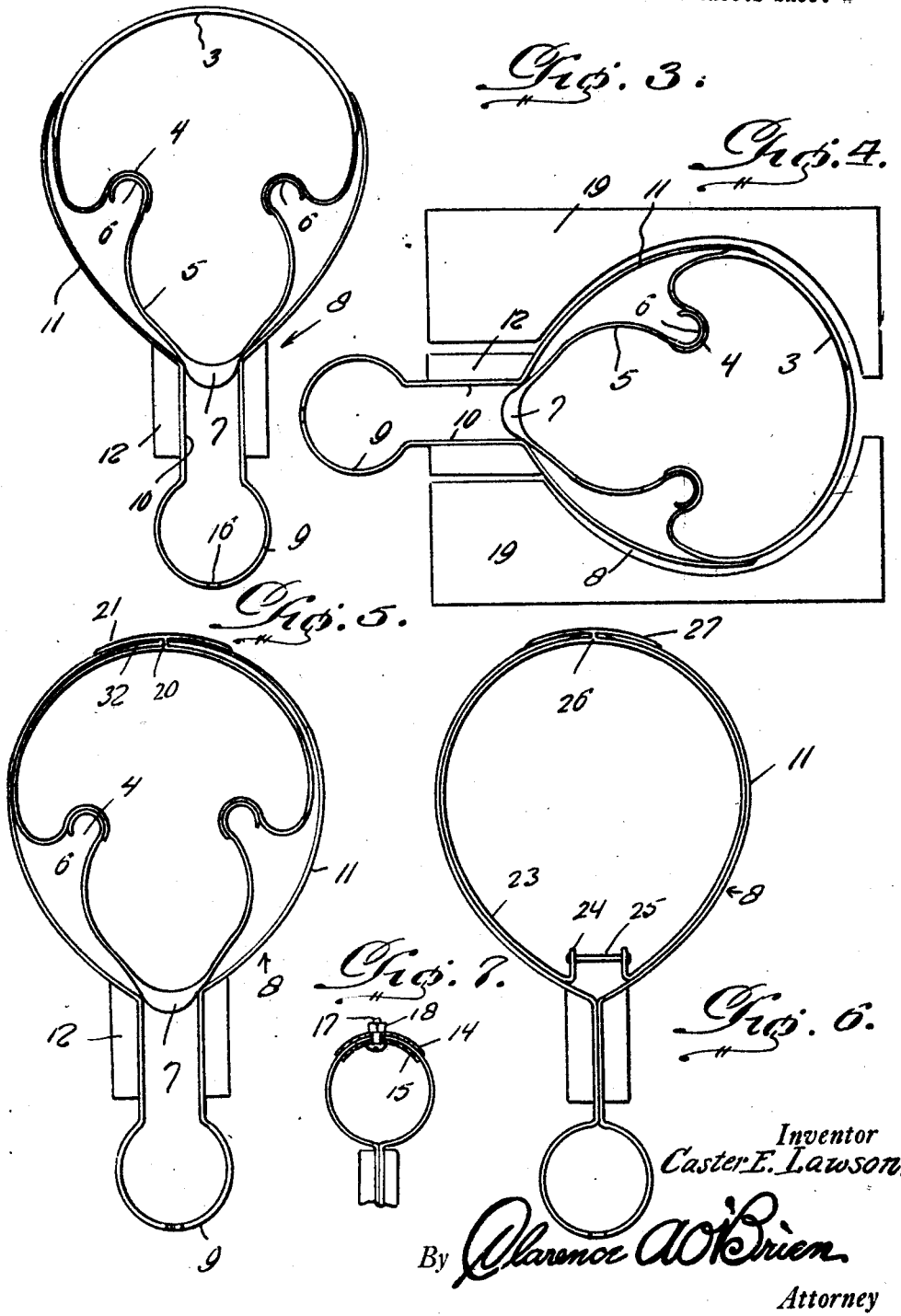

1,656,742

UNITED STATES PATENT OFFICE.

CASTER E. LAWSON, OF UTICA, OHIO.

CORE FOR AUTOMOBILE TIRES.

Application filed October 11, 1926. Serial No. 140,854.

The present invention relates to improvements in cores for use in the building and curing of pneumatic automobile tires.

At the present time, expansible air bags are employed for curing pneumatic tires after the same have been built. This operation is a costly one in that the expansible air bags are not durable and consequently cannot be used very long. Also by curing automobile tires in this manner, the operation of building and treating a tire necessitates independent operations or steps thus consummating a considerable length of time and labor.

One of the important objects of my invention is to provide a means for eliminating the use of the expansible air bag in curing a tire and furthermore will reduce the steps in the operation of building and curing a tire to a minimum.

Another important object of the invention is to provide a tire core of the above mentioned character which includes a plurality of segmental sections which are detachably secured together to form an annular core member, each section comprising an arcuate shaped shoe or crown portion of expansible material, which is adapted for disposition against the inner wall of the tread portion of the tire casing in the adjacent portions of the side walls, means being provided for effecting the expansion and contraction of each shoe in a simple and efficient manner.

A still further object is to provide a core of the above mentioned character which is simple in construction, inexpensive, strong and durable, and further well adapted to the purpose for which it is designed.

Other objects and advantages of the invention will become apparent as the nature of the invention will be understood and when taken in connection with the accompanying drawings.

In the accompanying drawings forming a part of this application:

Figure 1 is a side elevation of the complete core embodying my invention.

Figure 2 is a fragmentary detail perspective view of one of the sections, the core being shown expanded.

Figure 3 is an end elevation of one of the sections showing the parts in their contracted position.

Figure 4 is a similar view showing the core disposed within a mold.

Figure 5 is a view similar to Figure 3 showing a modification of the shoe or crown portion.

Figure 6 is an end elevation of a further modification.

Figure 7 is a detail sectional view of the securing means for the segmental sections, and Figure 8 is a fragmentary detail of a modificating of the contracting member.

In the drawings wherein for the purpose of illustration is shown the preferred embodiment of my invention, the numeral 1 designates generally my improved core, the same comprising a plurality of segmental sections which are adapted to have their adjacent ends detachably secured together to provide an annular core as is clearly shown in Figure 1. The securing means for the segmental sections will be hereinafter more fully described.

Each of the aforementioned segmental sections comprising an arcuate shaped shoe or crown portion 3 which is formed of sheet metal material. The longitudinal free edges of the crown or shoe 3 are disposed inwardly and terminate in rounded lips 4 as is clearly shown in Figures 2 and 3 of the drawings. The shoe or crown portion of each of the sections is adapted to be disposed adjacent the inner wall of the tread portion of the tire which is to be built on the core, as well as against the inner wall of the adjacent side portions.

Adapted for cooperation with the normally expansible shoe or crown portion 3 is what I term as the adjusting spring member 5. The same is also formed of sheet metal material and is bent in substantially U-shaped formation. The arms of said U-shaped adjusting member are curved outwardly and thence inwardly and the upper ends thereof terminate in outwardly disposed curved lips 6 which are adapted for engagement with the respective curved lips 4 of the shoe 3. This construction is also shown more clearly in Figures 2 and 3 of the drawings. A reinforcing rib 7 is formed on the bottom of the aforementioned U-shaped adjusting member 5.

The core further includes the provision of a contracting member, designated generally by the numeral 8. This member is formed of a single piece of sheet metal material which is bent longitudinally to provide the tubular portion 9. The end portions of the piece of material comprising the member 8 are then disposed outwardly in parallel spaced relation to provide what I term as web portions 10. The outer end portions of the webs are curved outwardly and thence inwardly to provide the jaws 11, the outer end portions of which engage the respective sides of the shoe 3 of each section. Suitable reinforcing ribs 12 are formed on the outer faces of the webs 10.

As is clearly shown in Figure 3 the rib 7 formed on the bottom face of the crown portion of each adjusting spring member 5 extends inwardly into and between the parallel spaced webs 10 thus causing the core to be normally contracted and to permit the tire to be built on the core.

The securing means for holding the segmental sections in properly assembled relation to form an annular core comprises a pair of curved metallic strips designated by the numerals 14 and 15 respectively. The adjacent ends of the segmental sections are provided with suitable notches shown at 16 which notches cooperate to form an opening. The strip 15 is disposed on the inside of the tubular portion 9 and is disposed over the registering notches formed in each pair of adjacent ends of the sections. The strip 14 is disposed on the outside of the tubular portion 9 over the meeting edges of the adjacent ends of each of the sections. These cooperating strips are formed with suitable openings which register with the aforementioned notches 16, and a bolt 17 extends through the registering openings in the strips and as well as through the notches 16. A nut 18 is threaded on the threaded end of the threaded end of the bolt. In this manner, the several sections are secured together in proper relation so that the core when assembled will not accidentally collapse.

With the parts arranged as shown in Figure 1, the tire is built up on the core in the maner well known in the art. After such operation, the sectional mold 19 shown generally in Figure 4 is disposed over the tire and the core prior to the curing operation. When pressure is applied on the sectional mold 19, the jaws 11 will move inwardly thus causing the ribs 7 to move out of engagement from between the parallel disposed webs 10 so that the core will be expanded and the parts thereof will assume the position shown in Figure 2. The shoe 3 will then be expanded so as to cooperate with the sectional mold in properly curing the tire.

In this manner, it will be unnecessary to remove the tire from the core which has been employed for building the tire up and then employing an expansible or inflatable bag for the purpose of curing the built up tire. The use of my improved core will eliminate the loss of considerable time and labor in the treatment of tires, and will also save considerable expense by the elimination of the inflatable air bag which is now principally used for the curing of pneumatic tires.

In Figure 5 of the drawings, a modification is shown wherein the shoe 3 is formed with a web 20 and extending laterally on the outer edge of this circumferentially disposed web 20 is the arcuate shaped circumferentially extending strip 21. The jaws 11 have their free ends curved inwardly for disposition between the adjacent faces of the shoe 3 and the strip 20 as indicated at 22 in Figure 5. The jaws are adapted for slidable movement over the side of the arcuate shaped shoe during the contraction and expansion of the core.

In Figure 6, a further modification is shown wherein the shoe 3 and the adjusting member 5 are displaced by the tubular member 23 which is formed from a single sheet of material bent into substantially circular formation. The free edges of this strip are disposed inwardly in parallel spaced relation to provide the flanges 24 and a securing bolt 25 is disposed between these flanges. A web 26 extends outwardly from the crown portion of the tubular member 23 and associated with the outer edge of this web is the elongated arcuate shaped strip 27. The member 8 which is associated with this form of the core is identical with that shown in Figure 5 and above described and therefore a detailed description thereof is thought unnecessary.

In Figure 8, the contracting member 8 is formed of separate parts and the same comprises the tubular portion 28 having the parallel disposed free edge portion 29. The curved arms 30 have their inner ends terminating in parallel disposed portions 31 which are disposed on the outside of the respective parallel portions 29.

The simplicity of my core enables the same to be easily assembled and furthermore will at all times be positive and efficient in carrying out the purposes for which it is designed. Also, the core may be adapted for ready assembly or disassembly and will not require the use of any number of complicated tools in gaining access to the several parts comprising the core.

While I have shown the preferred embodiment of my invention it is to be understood that minor changes in the size, shape, and arrangement of parts may be resorted to without departing from the spirit of the invention and the scope of the appended claims.

Having thus described the invention, what I claim as new and desire to secure by Letters Patent is:—

1. A core of the class described comprising a series of segmental sections, each section including an arcuate shaped head formed of expansible material, an expansible adjusting member operatively connected with said head, means for securing said sections together, said means comprising a pair of inner and outer plates extending over the adjacent edges of each pair of sections, and a securing bolt extending through said plates and through the adjacent edges of the sections.

2. A core of the class described comprising a series of ring forming sections, each section including an arcuate shaped head formed from a single blank of expansible material, the free edge portions of each head being disposed inwardly and terminating in curved lips, an adjusting member of substantially U-shaped design in cross section, the upper ends of the arms thereof being curved outwardly to provide lips adapted for cooperation with the aforementioned lips, and a member embracing the sides of the head and cooperating with the adjusting member to control the expansion and contraction of the core.

3. A tire core of the class described comprising a series of ring forming sections, each section including an arcuate shaped head formed from a single blank of expansible metal, the free edge portions of each head being disposed inwardly and terminating in curved lips, an adjusting member of substantially U-shaped design in cross section, a rib formed on the bottom of said adjusting member, the upper ends of the arms of the U-shaped adjusting member being curved outwardly to provide lips adapted for cooperation with the aforementioned lips, contracting member embracing the sides of the head and cooperating with said rib on the adjusting member to control the expansion and contraction of the core.

4. A tire core of the class described comprising a series of ring forming sections, each section including an arcuate shaped head formed from a single blank of expansible metal, the free edge portions of each head being disposed inwardly and terminating in curved lips, an adjusting member of substantially U-shaped design in cross section, a rib formed on the bottom of said adjusting member, the upper ends of the arms of the U-shaped adjusting member being curved outwardly to provide lips adapted for cooperation with the aforementioned lips, contracting member embracing the sides of the head and cooperating with said rib on the adjusting member to control the expansion and contraction of the core, said contracting member being formed from a single piece of sheet metal material which is bent longitudinally to provide a tubular portion, the ends thereof being disposed laterally in parallel spaced relation to provide webs, the outer end portions of the webs being curved outwardly and thence inwardly to provide jaws which embrace the opposite sides of the arcuate shaped head, said rib being adapted for disposition between the webs.

In testimony whereof I affix my signature.

CASTER E. LAWSON.